(12) United States Patent
O'Neill

(10) Patent No.: US 8,069,479 B2
(45) Date of Patent: Nov. 29, 2011

(54) POSITION AND VELOCITY-BASED MOBILE DEVICE MANAGEMENT

(75) Inventor: David J. O'Neill, Falls Church, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 880 days.

(21) Appl. No.: 11/945,631

(22) Filed: Nov. 27, 2007

(65) Prior Publication Data
US 2009/0138949 A1    May 28, 2009

(51) Int. Cl.
*G06F 7/04* (2006.01)
*G06F 12/00* (2006.01)
*G06F 12/14* (2006.01)
*G06F 17/30* (2006.01)
*H04M 3/00* (2006.01)
*H04M 11/00* (2006.01)
*H04W 36/00* (2009.01)
*H04W 4/00* (2009.01)

(52) U.S. Cl. ......... 726/21; 455/418; 455/407; 455/408; 455/466; 455/441

(58) Field of Classification Search .................. None
See application file for complete search history.

(56) References Cited

U.S. PATENT DOCUMENTS

| | | | |
|---|---|---|---|
| 6,778,837 B2 | 8/2004 | Bade et al. | |
| 6,795,017 B1 * | 9/2004 | Puranik et al. | 342/357.77 |
| 6,941,134 B2 * | 9/2005 | White | 455/418 |
| 7,565,230 B2 * | 7/2009 | Gardner et al. | 701/35 |
| 2002/0198005 A1 * | 12/2002 | Hilton et al. | 455/456 |
| 2004/0198220 A1 | 10/2004 | Whelan et al. | |
| 2005/0222933 A1 * | 10/2005 | Wesby | 705/36 |
| 2007/0004413 A1 * | 1/2007 | Mahajan et al. | 455/441 |
| 2007/0087764 A1 * | 4/2007 | Buckley et al. | 455/466 |

OTHER PUBLICATIONS

International Search Report dated Jan. 29, 2009 (1 page).

* cited by examiner

*Primary Examiner* — Shin-Hon Chen

(57) ABSTRACT

A set of one or more positional control parameters includes at least one of a geographic limit, a velocity limit, and a direction of travel limit. A control list identifies at least one feature in a mobile device. The at least one feature may be associated with at least one of the positional control parameters.

24 Claims, 3 Drawing Sheets

POSITION AND VELOCITY-BASED MOBILE DEVICE MANAGEMENT

BACKGROUND INFORMATION

Use of mobile devices such as cellular telephones, personal digital assistants, handled computers, etc., is quite common. Such mobile devices may provide for a variety of communications, e.g., voice communications, instant messaging, e-mail, etc. Further, mobile communications devices may be used in a variety of contexts, e.g., in homes, offices, schools, automobiles, etc.

Use of mobile communications devices presents a variety of potential risks and hazards. For example, it is particularly unsafe for drivers, particularly recently licensed drivers, to make and receive voice calls, send and receive text messages, etc. while driving. In another example of risks and hazards of using mobile communications devices, children at present are generally able to send and receive communications without limitations regarding the other parties with whom communications may be made, regardless of the child's geographic location. There is presently no way of preventing children from sending or receiving communications based on a geographic location of the child's mobile device. Moreover, there is presently no way to manage communications services available to children based on a geographic location of the child's mobile device. Further, therefore, there is no way to restrict or manage the other parties with whom a child may communicate based on a geographic location of the child's mobile device.

DETAILED DESCRIPTION OF THE PREFERRED EMBODIMENTS

Figure 1:
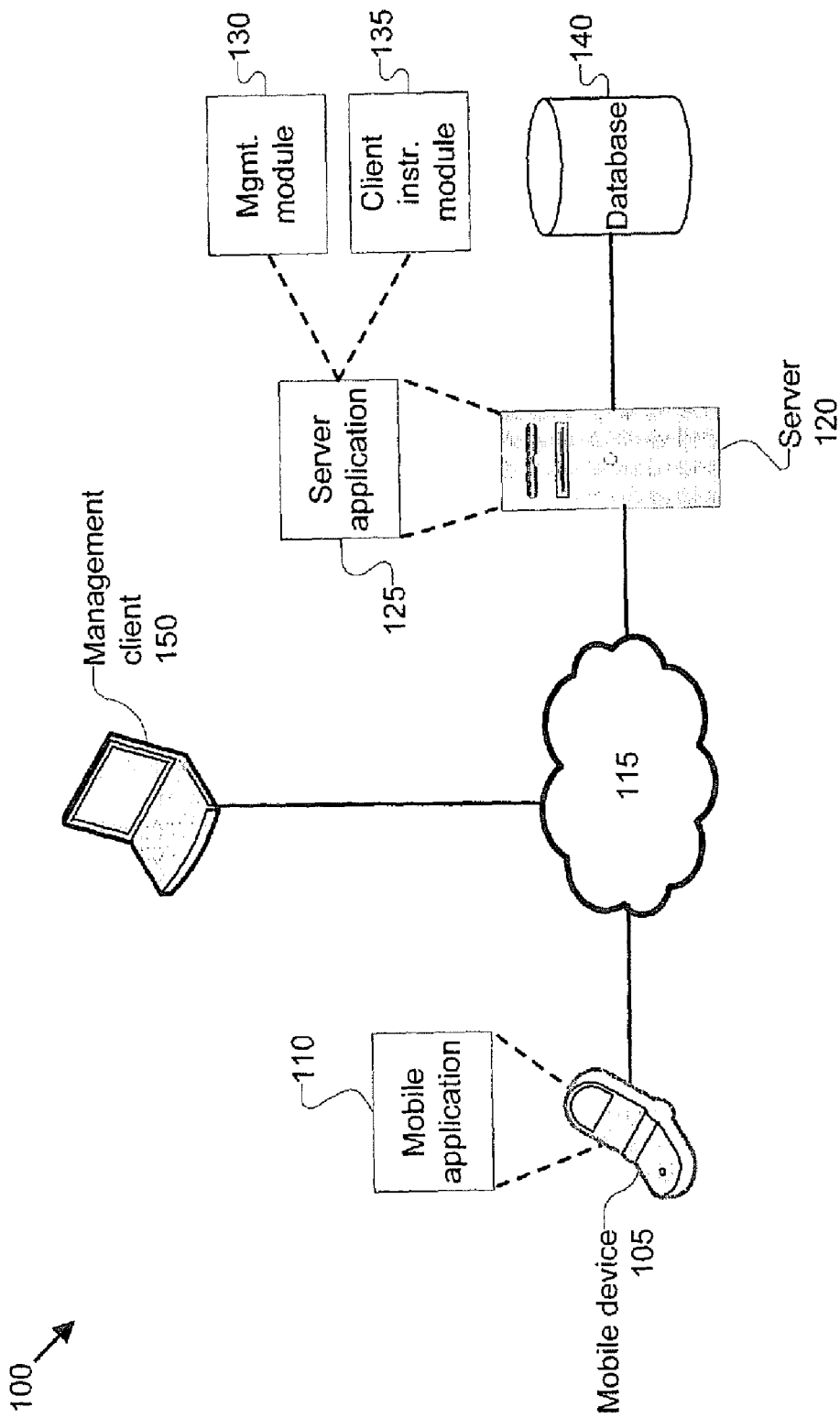
FIG. 1 illustrates an exemplary system for managing communications of a mobile device.

FIG. 1 illustrates an exemplary system 100 for managing communications of a mobile device 105. Mobile device 105 generally includes a mobile application 110, and communicates via a network 115 with a server 120. Server 120 in turn generally includes a server application 125, and communicates with a communications management database 140. A management client 150 may further be in communication with server 120, e.g., via network 115.

Client device 105 may be any one of a number of known mobile or portable computing devices, such as a cellular telephone, personal digital assistant, handheld computer, or any other device capable of sending and receiving communications Client device 105 includes a software operating system and/or firmware sufficient to allow for the operation of mobile application 110. Mobile application 110 may be developed according to a number of known technologies and or operating systems that may be installed on client device 105, such as Java™ Platform, Micro Edition, also known as J2ME, distributed by Sun Microsystems of Santa Clara, Calif.; Openwave® WAP Push Library for Wireless Application Protocol (WAP), distributed by Openwave Systems Inc., of Redwood City, Calif.; Binary Runtime Environment for Wireless (BREW®), distributed by Qualcomm, Inc., of San Diego, Calif.; the Microsoft®.Net Compact Framework, distributed by Microsoft Corporation of Redmond, Wash.; Palm OS®, distributed by Palm, Inc., of Sunnyvale, Calif.; Windows® Mobile, distributed by Microsoft Corporation of Redmond, Wash.; Symbian OS distributed by Symbian, Ltd., of London, United Kingdom, etc.

Client device 105 generally, in addition to a display that usually but not necessarily incorporates a graphical user interface (GUI), includes one or more known input devices, such as a pointing device, keyboard or keypad, touch screen, etc. Accordingly, mobile application 110, in combination with one or more input devices in client device 105, sends and receives communications, etc., via network 115. As discussed further below, according to instructions received from a client instruction module 135 included in server application 125, mobile application 110 may allow or prevent client device 105 to send or receive communications to or from particular other devices, e.g., based on a geographic location, velocity, direction of travel, etc. of client device 105.

Mobile application 110 is also generally configured to determine positional attributes such as the geographic location, direction of travel, and/or velocity, etc. of client device 105, e.g., using a global positioning system (GPS) or the like. Alternatively, a geographic location for client device 105 may be determined by identifying a radio communications device at a fixed geographic location, e.g., a cellular telephone tower, with which client device 105 is in communication. Further, a velocity and/or direction of travel of client device 105 may be determined, or at least approximated, by an identification of two or more radio communications devices, e.g., cellular telephone repeaters, at fixed geographic locations with which client device 105 has been in communication in a period of time.

Network 115 is a network that transports data between telecommunications and/or computing devices, such as a cellular telephone network, a local area network (LAN), a wide area network (WAN) such as the Internet, etc. Further, network 115 may be a combination of one or more such networks.

Server 120 is generally a combination of hardware and software, the software including an operating system such as the Windows or Linux operating systems, or a variation of the Unix operating system, such as Solaris, distributed by Sun Microsystems of Santa Clara, Calif., or AIX, distributed by International Business Machines of Armonk, N.Y. Accordingly, server application 125 may be written according to a number of different known programming technologies, or a combination thereof, such as the Java programming language, the C sharp programming language, C/C++, NET, etc.

Server application 125 generally includes one or more separate computer programs or modules, such as a management module 130 and a client instruction module 135. Management module 130 is generally responsible for communications with management client 150. Accordingly, management module 130 may be accessed via network 115, and may provide a user interface, e.g., a graphical user interface, for display in a web browser or the like. As discussed further below, a user of management module 130 may obtain information concerning a location and velocity of client device 105. Further, a user of management module 130 may provide input that may be used by client instruction module 135 to control the ability of client device 105 to send and receive communications based on a location, direction of travel, and/or velocity of client device 105.

Management client 150 may be any one of a variety of computing devices, e.g., a desktop computer, laptop computer, handheld computer, cellular telephone, personal digital assistant, etc. In general, management client 150 includes a web browser or the like for accessing a user interface, e.g., a GUI, provided by server application 125, including management module 130. Management client 150 generally communicates with server 120 through network 115.

Computing devices in various embodiments such as client device 105 and server 120 may each include computer-executable instructions. Such instructions may be compiled or interpreted from computer programs created using a variety of known programming languages and/or technologies, including, without limitation, and either alone or in combination, Java™, C, C++, Visual Basic, Java Script, Perl, etc., as mentioned above. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RE) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Database generally includes a structured file (e.g., comma delimited, tab delimited, etc.) or a relational database management system (RDBMS). Further, database 140 may be capable of storing and providing data in addition to alphanumeric data, such as image data, binary data, etc. Generally, an RDBMS generally employs the well known Structured Query Language (SQL) in addition to a language for creating, storing, editing, and executing stored procedures. However, it is to be understood that database 140 may be some other kind of database such as a hierarchical database, a file, a set of files, an application database in a proprietary format, etc. Database 140 generally includes a computing device employing a computer operating system such as one of those mentioned above, and is accessible via a network, such as a local area network (LAN), wide area network (WAN), etc. Further, it is possible that database 140 is included in server 120.

Figure 2:
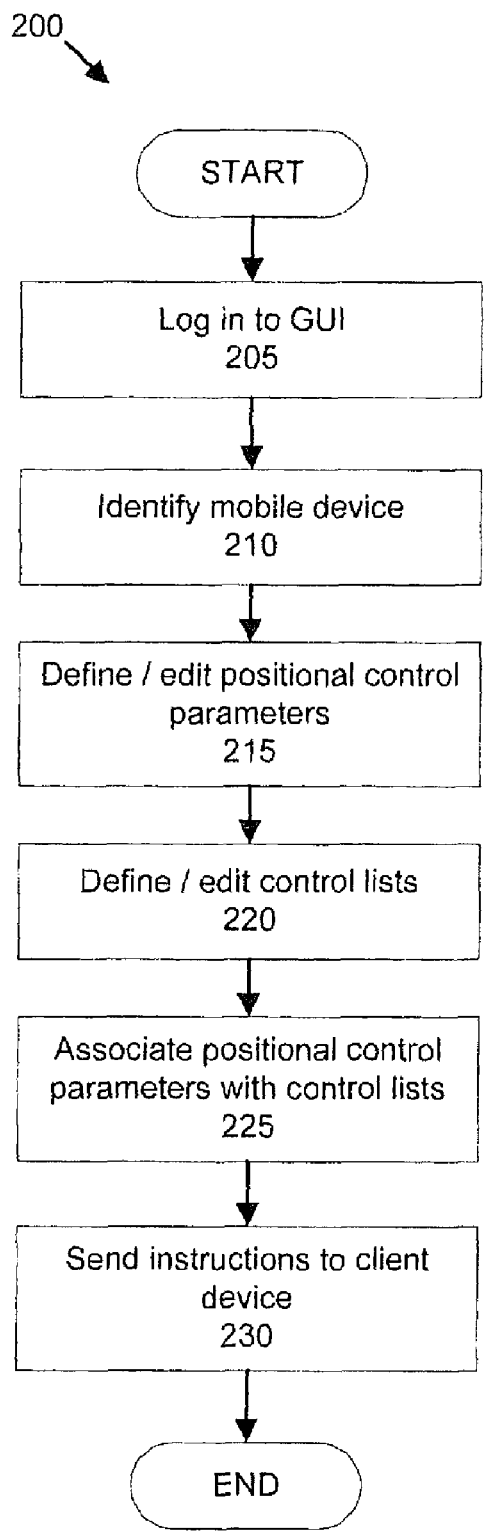
FIG. 2 illustrates an exemplary process for providing instructions to a mobile client device.

FIG. 2 illustrates an exemplary process 200 for providing instructions to mobile device 105. Some or all of the steps of process 200 may be carried out according to program instructions included in server application 125, and management module 130 in particular. In general, some or all of the steps of process 200 are tangibly embodied as a set of computer-executable instructions stored on a computer-readable medium within or accessible by server 120.

Process 200 begins in a step 205, in which a user of management client 150 logs into server application 125, e.g., by providing a user name and password validated against information stored in database 140. Accordingly, in step 205, a graphical user interface (GUI) or the like provided by management module 130 may be accessed and displayed in management client 150.

Next, in step 210, generally by providing input to a form or the like provided in the GUI provided by management module 130, a user of management client 150 identifies a mobile device 105 with respect to which the user wishes to define or edit positional control parameters and/or control lists. Positional control parameters and control lists are described in more detail below. A mobile device 105 may be identified in a variety of different ways, e.g., by a telephone number, user name, or some other appropriate and unique or substantially unique identifier. Database 140 may store information to confirm that the user who has logged in to server application 125 as described above with respect to step 205 has permission to create or edit positional control parameters and control lists with respect to the identified mobile device 105. For example, a parent may have such permissions with respect to mobile devices 105 possessed by one or more children.

Next, in step 215, a user logged into server application 125 may define and/or edit positional control parameters. Positional control parameters generally include limits relating to a position of device 105 such as limits relating to geographic location, velocity, and/or direction of travel that may be used to govern access to features and functions of mobile device 105. For example, positional control parameters may include boundaries defining a geographic area, e.g., a schoolyard, a place of business, a set of city blocks, etc. Further, positional control parameters may include limitations on velocity and direction of travel, e.g., 5 mph, 20 mph, 60 mph, northwest, south, etc.

In some cases, step 215 may be omitted from process 200 because a system administrator or the like has defined positional control parameters that are stored in database 140 and retrieved when a user accesses the GUI provided by management module 130. In such cases, a common set of positional control parameters may be made available to all or a predetermined subset of users of server application 125.

Next, in step 220, a user logged into server application 125 may define and/or edit control lists. A control list may define a set of features in mobile client device 105 that are approved for access or that are to be blocked for access. For example, a control list may include voice communications and reading text messages as an approved list of features. Similarly, a control list may include sending text messages and playing games as a blocked list of features. Alternatively or additionally, a control list may define one or more other devices, e.g., according to telephone number, that are approved or blocked from communications with mobile client device 105.

Next, in step 225, a user logged into server application 125 may associate positional control parameters with control lists. Accordingly, position control parameters may be used in combination with control lists to limit access to features and/or communications with other parties in mobile client device 105. For example, a parent may wish a child to be able to use mobile client device 105 only for emergency telephone calls while in school, and may therefore associate a position control parameter providing the school's geographic location with a the parent's daytime telephone number included in a control list. To take another example, a parent may not want a child to be able to use mobile client device 105 while driving, and may therefore associate a velocity position control parameter, e.g., 10 mph, with a blocked feature control list identifying all features of mobile client device 105.

Next, in step 230, management module 130 sends instructions to mobile client device 105. Such instructions generally include positional control parameters, control lists, and associations of positional control parameters and control lists, such as may be established as described above with respect to step 225.

An association or set of associations between features and functions identified in a position control list with one or more positional control parameters may be stored in database 140 in a variety of ways, e.g., in a file, in a relational table, etc. However, when provided to device 105 by management module 130, associations between positional control parameters and items in a control list are generally provided in a structured file, ergo, an extensible markup language file (XML), a comma delimited file, or the like.

Following step 230, process 200 ends.

Figure 3:
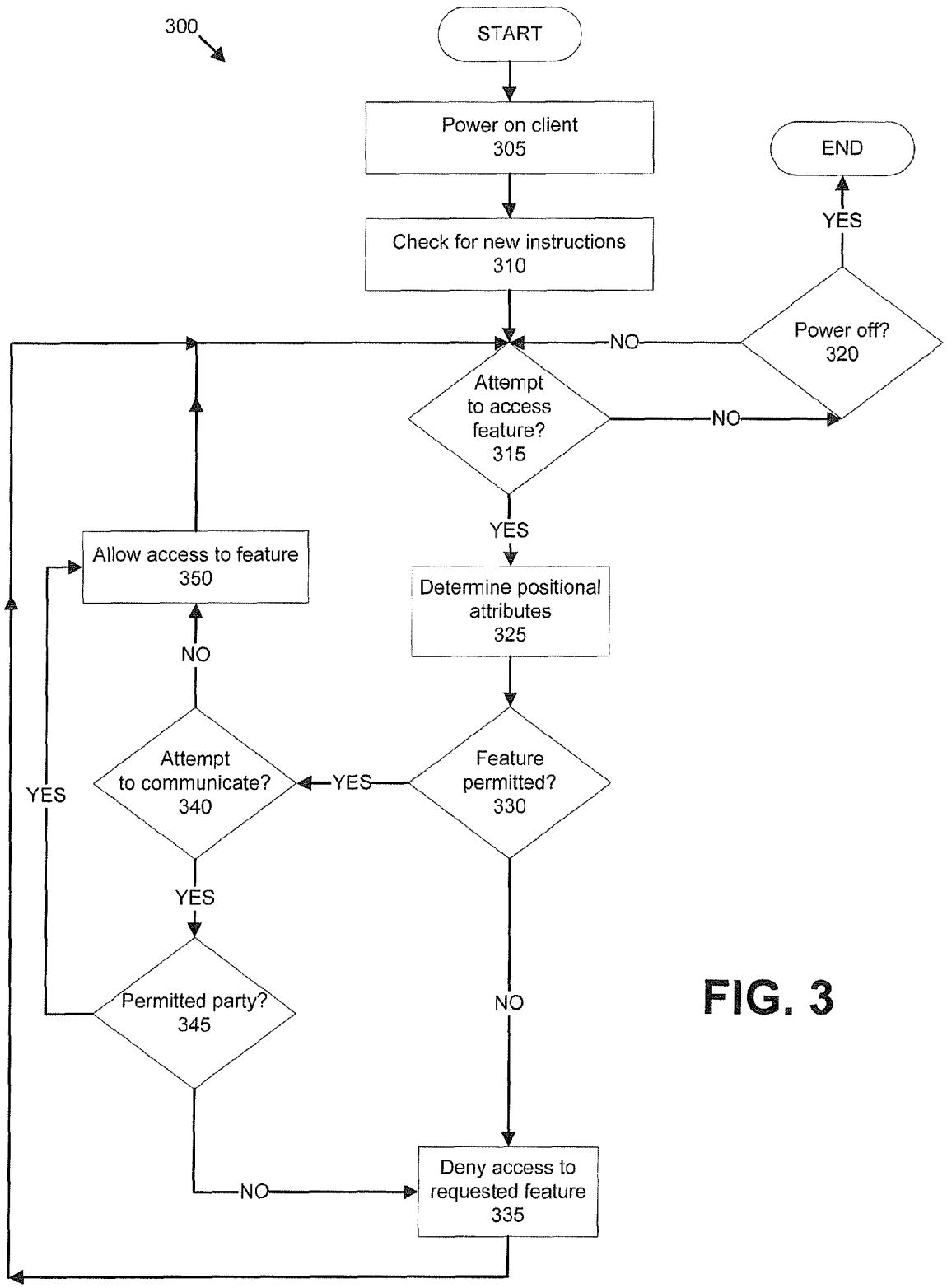
FIG. 3 illustrates an exemplary process for a mobile client device to access features and send and receive communications.

FIG. 3 illustrates an exemplary process 300 for a mobile client device 105 to access features and send and receive communications. Some or all of the steps of process 300 may be carried out according to program instructions included in mobile application 110. In general, some or all of the steps of process 300 are tangibly embodied as a set of computer-executable instructions stored on a computer-readable medium included in or accessible by mobile device 105.

Process 300 begins with a step 305, when mobile client device 105 is powered on.

Next, in step 310, mobile application 110 is loaded into a memory of mobile device 105, whereupon mobile application 110 begins to execute and queries server application 125 for instructions related to positional control parameters and control lists, as discussed above. In some cases, although not explicitly illustrated in FIG. 3, mobile application 110 may retrieve such instructions from a memory of device 105, and may be programmed periodically to query server application 125 for any new instructions.

Next, in step 315, mobile application 110 determines whether a user of mobile client device 105 has attempted to access any features available in mobile client device 105. For example, a user could attempt to place a telephone call, send a text message, access a web browser, access a game, etc. If a user has not attempted to access any feature, step 320 is executed next. However, if a user has requested a feature, then step 325 is executed next.

In step 320, a determination is made concerning whether a user has provided input to power off client device 105. If so, or if device 105 has been powered off for any other reason, then process 300 ends. Otherwise, process 300 returns to step 315.

In step 325, following a user attempt to access a feature of mobile client device 105 as described above in step 315, mobile application 110 determines positional attributes of client device 105. For example, as discussed above, positional attributes may include a location, a velocity, and/or a direction of travel. Such positional attributes may be determined in a variety of ways, as discussed above.

Next, in step 330, mobile application 110 determines whether the feature requested in step 315 is presently permitted to be accessed. For example, the application 110 may access positional control parameters and a control list, mentioned above, to determine whether such access is permitted based on the positional attribute or attributes determined in step 325. That is, the application 110 may determine whether mobile client device 105 is within a location, has a velocity, direction, etc, governed by a positional control parameter. Application 110 may then determine whether such location, velocity, etc. is associated with a feature according to a control list.

It should be apparent that there are many different combinations of restrictions that may be imposed through positional control parameters and control lists. For instance, mobile client device 105 may be prohibited from placing voice calls or sending text messages while mobile device 105 is in motion, i.e., while device 105 has any velocity greater than zero. Moreover, mobile client device 105 may be prohibited from sending or receiving text messages while mobile device 105 is in a certain geographic location, e.g., within the boundaries of a school campus.

If it is determined in step 330 that the requested feature is not permitted, e.g., based on use of positional control parameters and a control list as described above, then step 335 is executed next. However, if the feature requested in step 315 is permitted, then step 340 is executed next.

In step 335, application 110 denies a user access to the feature requested in step 315. For example, a user may attempt to place a voice phone call, where a voice phone call is a prohibited feature. Therefore, through use of positional attributes, positional control parameters, and a control list as described above, application 110 determined to deny the request. In such event, application 110 may cause to be displayed on an interface of mobile client device 105 and message, e.g., "Feature Unavailable." Following step 335, process 300 returns to step 315.

In step 340, application 110 determines whether the feature requested in step 315 is an attempt to send or receive a communication, or is some other feature. For example, a user could be attempting to access a directory of contacts or the like, play a game, or access any one of a number of other features provided by a mobile device 105 that do not involve sending or receiving a communication. On the other hand, a user could be attempting to send or receive a voice communication, send or receive a text communication, browse the Internet, etc. If the feature requested in step 315 is not an attempt to send or receive a communication, then step 345 is executed next. Otherwise, step 350 is executed next.

In step 345, after having determined as described above with respect to step 340 that the feature requested in step 315 is an attempt to send or receive a communication with a second mobile device, application 110 determines whether the device with whom mobile client device 105 is attempting to communicate is a device with which the mobile client device 105 is permitted to communicate. That is, application 110 may determine whether an identifier for the device is included on an applicable control list. If the device is permitted (sometimes referred to as a "permitted party" inasmuch as mobile devices are sometimes associated with individual parties), step 350 is executed next. Otherwise, step 335 is executed next.

In step 350, application 110 allows access to the feature requested in step 315. That is, in step 350 application 110 generally executes some requested functionality, e.g., communicating with another party or device, providing access to a game or other feature of mobile device 105, etc. Following step 350, process 300 returns to step 315.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication in made herein. In particular, use of the singular articles such as "a," "the," "said," etc. should be read to recite one or more of the indicated elements unless a claim recites an explicit limitation to the contrary.

What is claimed is:

1. A system comprising a server that includes a computer-readable medium tangibly embodying computer-executable instructions, the instructions comprising management control instructions for:
    receiving a set of one or more positional control parameters, the positional control parameters including at least one of a geographic limit, a velocity limit, and a direction of travel limit;
    receiving a control list that identifies at least one feature in a first mobile device;
    associating the at least one feature with at least one of the positional control parameters, thereby generating at least one association between one of the features and one of the positional control parameters, the at least one feature being one of a permitted feature and un-permitted feature based on the association; and
    associating, in response to the feature being a permitted feature and in response to the feature being a request to communicate with at least one second mobile device, the second mobile device with at least one of a permitted party and an un-permitted party; and
    storing the management control instructions in a database.

2. The system of claim 1, the instructions further comprising instructions for:
    receiving the request from the first mobile device for the at least one association; and
    transmitting the at least one association to the first mobile device.

3. The system of claim 1, the at least one feature including at least one of a game, a voice communication, a text communication, and a web browser.

4. The system of claim 1, further comprising a first mobile device including a computer-readable medium tangibly embodying computer-executable instructions, the management control instructions comprising instructions for:
    downloading from the database a set of one or more associations between the at least one feature in the first mobile device and the at least one positional control parameter selected from one of the geographic limit, velocity limit, and direction of travel limit;
    receiving a request to access a specified feature in the first mobile device;
    determining the at least one positional attribute of the first mobile device; and
    determining, based at least in part on evaluating the specified feature and the positional attribute according to the set of one or more associations, whether the request is granted.

5. The system of claim 1, wherein the control list identifies the at least one second mobile device as a permitted party based on preferences associated with the first mobile device.

6. A system comprising a first mobile device including a computer-readable medium tangibly embodying computer-executable instructions, the instructions comprising instructions for:
    downloading a set of one or more associations between at least one feature in the first mobile device and at least one positional control parameter selected from one of a geographic limit, a velocity limit, and a direction of travel limit;
    receiving a request to access a specified feature in the first mobile device;
    determining at least one positional attribute of the first mobile device;
    determining whether the specified feature is a permitted feature based at least in part on evaluating the specified feature and the positional attribute according to the set of one or more associations;
    determining, in response to the specified feature being a permitted feature, if the specified feature is a request to communicate with at least one second mobile device; and
    determining, in response to the specified feature being a request to communicate with the at least one second mobile device, if the second mobile device is a permitted party independent of the permitted feature.

7. The system of claim 6, wherein the set of one or more associations includes one or more identifiers for other mobile devices.

8. The system of claim 6, the instructions further comprising instructions for denying the request if an identifier for the second mobile device is not included in the one or more identifiers.

9. The system of claim 7, the instructions further comprising instructions foi denying the request if an identifier for the second mobile device is not associated with the at least one positional attribute in the set of one or more associations.

10. The system of claim 6, wherein the positional attribute is a velocity, the instructions further comprising instructions for denying the request if the velocity exceeds a predetermined threshold included in the set of one or more associations.

11. The system of claim 6, further comprising a server that includes a computer-readable medium tangibly embodying computer-executable instructions, the instructions comprising instructions for:
    receiving a set of one or more positional control parameters, the positional control parameters including at least one of a geographic limit, a velocity limit, and a direction of travel limit;
    receiving a control list that identifies the at least one feature in the first mobile device;
    associating the at least one feature with at least one of the positional control parameters, thereby generating at least one association between one of the features and one of the positional control parameters;

receiving the request from the first mobile device for the at least one association; and transmitting the at least one association to the first mobile device.

12. The system of claim 6, wherein the set of one or more associations includes defining the at least one second mobile device as a permitted party.

13. The method of claim 6, further comprising granting the request in response to the specified feature being a permitted feature and the second mobile device being a permitted party.

14. A method, comprising:

receiving, in a server, a set of one or more positional control parameters, the positional control parameters including at least one of a geographic limit, a velocity limit, and a direction of travel limit;

receiving a control list that identifies at least one feature in a first mobile device;

associating the at least one feature with at least one of the positional control parameters, thereby generating at least one association between one of the features and one of the positional control parameters, the at least one feature being one of a permitted feature and un-permitted feature based on the association; and associating, in response to the feature being a permitted feature and in response to the feature being a request to communicate with at least one second mobile device, the second mobile device with at least one of a permitted party and an un-permitted party; and storing the management control instructions in a database.

15. The method of claim 14, further comprising:

receiving the request from the first mobile device for the at least one association; and transmitting the at least one association to the first mobile device.

16. The method of claim 14, the at least one feature including at least one of a game, a voice communication, a text communication, and a web browser.

17. The method of claim 14, further comprising:

downloading to the first mobile device, from the database, a set of one or more associations between the at least one feature in the first mobile device and the at least one positional control parameter selected from one of the geographic limit, velocity limit, and direction of travel limit;

receiving a request to access a specified feature in the first mobile device;

determining the at least one positional attribute of the first mobile device; and determining, based at least in part on evaluating the specified feature and the positional attribute according to the set of one or more associations, whether the request is granted.

18. A method, comprising:

downloading to a first mobile device a set of one or more associations between at least one feature in the first mobile device and at least one positional control parameter selected from one of a geographic limit, a velocity limit, and a direction of travel limit;

receiving a request to access a specified feature in the first mobile device;

determining at least one positional attribute of the first mobile device;

determining whether the specified feature is a permitted feature based at least in part on evaluating the specified feature and the positional attribute according to the set of one or more associations;

determining, in response to the specified feature being a permitted feature, if the specified feature is a request to communicate with at least one second mobile device; and determining, in response to the specified feature being a request to communicate with the at least one second mobile device, if the second mobile device is a permitted party independent of the permitted feature.

19. The method of claim 18, wherein the set of one or more associations includes one or more identifiers for other mobile devices.

20. The method of claim 19, further comprising denying the request if an identifier for the second mobile device is not included in the one or more identifiers.

21. The method of claim 19, further comprising denying the request if the identifier for the second mobile device is not associated with the at least one positional attribute in the set of one or more associations.

22. The method of claim 18, wherein the positional attribute is a velocity, the method further comprising denying the request of the velocity exceeds a predetermined threshold included in the set of one or more associations.

23. The method of claim 18, further comprising:

receiving, in a server, a set of one or more positional control parameters, the positional control parameters including at least one of a geographic limit, a velocity limit, and a direction of travel limit;

receiving, in the server, a control list that identifies at least one feature in the first mobile device;

associating, in the server, the at least one feature with at least one of the positional control parameters, thereby generating at least one association between one of the features and one of the positional control parameters;

receiving, in the server, a request from the first mobile device for the at least one association; and transmitting the at least one association to the first mobile device from the server.

24. The method of claim 18, further comprising granting the request in response to the specified feature being a permitted feature and the second mobile device being a permitted party.

* * * * *